United States Patent [19]
Prior et al.

[11] Patent Number: 4,592,966
[45] Date of Patent: Jun. 3, 1986

[54] METHODS OF MANUFACTURING INORGANIC RESIN BOUND ARTICLES AND PRODUCT

[75] Inventors: William L. Prior, Newark; William C. Sargeant, Bolivar, both of Ohio

[73] Assignee: Masonite Corporation, Chicago, Ill.

[21] Appl. No.: 689,707

[22] Filed: Jan. 8, 1985

Related U.S. Application Data

[63] Continuation-in-part of Ser. No. 656,686, Oct. 1, 1984, which is a continuation-in-part of Ser. No. 415,314, Sep. 7, 1982, Pat. No. 4,504,555.

[51] Int. Cl.$^4$ .................. B05D 1/36; B05D 7/00; B32B 9/00; B32B 19/00
[52] U.S. Cl. .................. 428/689; 427/403; 427/419.1; 427/419.2; 428/701; 428/702; 428/704
[58] Field of Search .......... 264/42, 46.4; 427/403, 427/419.1, 419.2, 419.7, 326, 322; 428/689, 284, 699, 701, 702, 703, 704; 501/109, 111

[56] References Cited

U.S. PATENT DOCUMENTS 4,141,744  2/1979  Prior et al. .................. 106/106 X
4,315,967  2/1982  Prior et al. .................. 428/285

Primary Examiner—Michael R. Lusignan
Attorney, Agent, or Firm—Mason, Kolehmainen, Rathburn & Wyss

[57] ABSTRACT

Two distinct resin compositions are provided in two physically separated components—one component impregnates a liquid-penetrable article substrate, such as a paper web, to provide a reactive substrate capable of forming a resin cement in situ upon contact with the other component. A first inorganic resin component, hereinafter referred to as component A, is a liquid comprising an aqueous composition of an aluminum phosphate, or a magnesium phosphate or a mixture thereof. A second component, hereinafter referred to as component B, is a liquid comprising an aqueous vehicle; a phosphate-reactive constituent selected from a magnesium oxide source, reactive wollastonite, or mixtures thereof having a relatively low surface area, e.g. dead-burned magnesium oxide having a surface area of about 0.75 m$^2$/gm; and a non-reactive phosphate dispersing agent.

48 Claims, No Drawings

METHODS OF MANUFACTURING INORGANIC RESIN BOUND ARTICLES AND PRODUCT

CROSS REFERENCE TO RELATED APPLICATIONS

This application is a continuation in part of copending application Ser. No. 656,686, filed Oct. 1, 1984, which is a continuation in part of copending application Ser. No. 415,314, filed Sept. 7, 1982, now U.S. Pat. No. 4,504,555 patented Mar. 12, 1985.

BACKGROUND OF THE INVENTION

A. Field of the Invention

This invention relates to porous, e.g. fibrous, articles structurally strengthened by inorganic resin impregnant compositions and to processes for forming them and articles of manufacture including such solid, porous articles, such as paper, fibrous webs of cellulose, glass or synthetic fibers impregnated with the inorganic resin composition and, more particularly, to inorganic resin cement articles having a unique combination of properties and a wide range of uses. A water composition containing a source of magnesium oxide and/or wollastonite is impregnated into the porous substrate to provide a reactive substrate capable of long storage life. The reactive substrate then is impregnated with a magnesium phosphate or aluminum phosphate composition causing a reaction with the magnesium oxide to form a resin bound article of manufacture. The inorganic resin cements are formed in situ within an initially porous article in accordance with the principles of the present invention and may be formed as noncellular or cellular structures.

B. Prior Art

A number of inorganic resin cement systems are known. Some are formed of magnesium oxychlorides or magnesium oxysulfates (U.S. Pat. Nos. 3,320,077; 4,141,744; and 4,315,967); and others are formed using phosphates and magnesia. Exemplary of this latter type are compositions of an acid magnesium phosphate, magnesia, silica, mineral fibers and water in an amount from 70 to 140% of the weight of the remaining components (U.S. Pat. No. 3,752,684); compositions in which a low reactivity magnesia is reacted with an acid aluminum phosphate complex containing an anion of a mineral acid (other than an oxyphosphorus acid) or of a carboxylic acid (U.S. Pat. No. 3,923,534); and compositions formed of a solution of an acid and aluminum phosphate (e.g., $Al(PO_4)_3$) slurried with silica, alumina and magnesia (U.S. Pat. No. 3,991,254). The insulating materials of U.S. Pat. No. 3,752,684 require the removal of large amounts of water at elevated temperatures; the cold setting refractory materials of U.S. Pat. No. 3,923,534 require extended periods (e.g., 6–8 hours) to set and the slurries used to form the insulating structures of U.S. Pat. No. 3,991,254 must be fired at 500° C. or above. Finally, mono-ammonium and diammonium phosphates have been reacted with dead-burned magnesium oxide. These compositions have a number of inherent disadvantages, among which are intense ammonia odor, and the formation on top of the resulting cements of a phosphate solution residue. Generally, such prior art inorganic resin systems using phosphates and magnesia have been of a character which has limited their uses to such applications as refractory linings, thermal insulation and use in preparing fast-setting, bonded aggregate structures as replacements for cements and mortars.

SUMMARY OF THE INVENTION

The inorganic resin bond articles of the present invention invention are formed by an exothermic reaction between an aluminum phosphate or a magnesium phosphate, or mixtures, with a source of magnesium oxide or wollastonite or mixtures. The rapid exothermic reaction drives off any water in the liquid reaction mixture without the use of externally applied heat.

The inorganic resins of the present invention can replace at least a portion of the presently known organic resins in a wide range of applications, for example molded configurations (in cellular and noncellular structures); thermal, electrical and/or acoustical insulations; binders and adhesives; coatings and/or surfacing agents; patching compositions; manmade boards including organic, e.g., cellulosic, fibers and/or inorganic fibers such as fiberglass and the like. A water slurry containing a source of magnesium oxide is impregnated into the porous substrate to provide a reactive substrate capable of long storage life. The reactive substrate then is impregnated with a magnesium phosphate or aluminum phosphate causing a reaction with the magnesium oxide to form a resin bound article of manufacture. The resins also can be deposited onto an upper surface of a liquid penetrable substrate, such as a fiberboard support surface, to adhere the resin to the fiberboard to form a composite article.

Further, the use of relatively inexpensive materials compared to typical organic resins offers a number of advantages over many of the organic resins destined for similar applications. The inorganic resins of the present invention can be formulated to be essentially nonflammable, strong and resistant to water and most chemicals including acids, alkalies and organic solvents.

It is therefore an object of the present invention to provide a two-component system for forming improved inorganic resin cement articles of manufacture. Another object of the present invention is to provide a two-component liquid system such that when the two components remain separated, they have an extended shelf life of months or years, but when the two components are mixed, they begin to react exothermically to form an inorganic resin capable of structurally strengthening a wide variety of liquid penetrable substrates and can be cast or molded into various structures, e.g., piping, ductwork, paneling, and the like.

A further object of the present invention is to provide a unique inorganic resin filled and strengthened substrate having good electrical, thermal and acoustical insulative properties, wherein the substrate is essentially nonflammable, nonsmoking and odor free. Another object of the present invention is to provide a new and unexpected inorganic resin cement-filled substrate having unexpected strength, resistance to elevated temperatures, chemicals, water, ultra-violet radiation exposure while being machinable and nonfriable, and resistant to abrasion and abrupt temperature changes.

A still further object of the present invention is to provide a two-component liquid impregnating system for forming improved inorganic resin cement-bonded and strengthened articles of manufacture. A liquid-penetrable article, such as a fibrous web or paper, is at least partially impregnated with a liquid slurry containing a source of magnesium oxide to form a reactive substrate. After drying, the reactive substrate then is contacted with a liquid slurry containing aluminum phosphate and/or magnesium phosphate to cause an exothermic reaction forming the resin cement in situ within the liquid-penetrable article without the need for any externally supplied heat to remove water or to effect final curing. The time period over which the resin forming composition remains liquified, the set-up time, the foaming time and the foam set time for cellular resins using a blowing agent may be controlled and predetermined.

These and other objects and advantages of the present invention will be apparent from the following detailed description of the invention.

DETAILED DESCRIPTION OF THE PREFERRED EMBODIMENTS OF THE PRESENT INVENTION

According to one important feature of the present invention, two distinct resin compositions are provided in two physically separated components-one component impregnates a liquid-penetrable article to provide a reactive substrate capable of forming a resin cement in situ upon contact with the other component. A first inorganic resin component, hereinafter referred to as component A, is a liquid comprising an aqueous composition of an aluminum phosphate, or a magnesium phosphate or a mixture thereof. A second component, hereinafter referred to as component B, is a liquid comprising an aqueous vehicle; a phosphate-reactive constituent selected from a magnesium oxide source, reactive wollastonite, or mixtures thereof having a relatively low surface area, e.g. dead-burned magnesium oxide having a surface area of about 0.75 $m^2/gm$; and a non-reactive phosphate dispersing agent. Components A and B should have viscosities permitting them to be rapidly and thoroughly impregnated into the liquid-penetrable substrate. When immediate reaction is desired, both liquid components can be initially mixed together.

In accordance with another important feature of the present invention, an unreactive low-water demand filler, e.g., silica, milled fibers or a preformed cellular material, can be added to component A. An essentially non-reactive wollastonite also may be added to component A to give the resin added resistance to cracking. The resin may be made in cellular form by adding a blowing agent, preferably calcium carbonate, to component B and a surfactant to either or both components.

In accordance with another important feature of the present invention, a water slurry containing a source of magnesium oxide is impregnated into the porous substrate to provide a reactive substrate capable of long storage life. The reactive substrate then is impregnated with a magnesium phosphate or aluminum phosphate causing a reaction with the magnesium oxide to form a resin bound article of manufacture. Set up times, once component A impregnates the reactive substrate, range from 30 seconds to several minutes. Alternatively, the two liquid components can be mixed in a continuous mixing head to form the resin cement mixtures as the mixture is sprayed from the mixing head toward a liquid-penetrable substrate or onto solid particles or fibers forming the substrate, as in the dry method of paper manufacture or in the "TMC" method of fiberglass molding compound manufacture. The liquid-penetrable substrate can be any substrate capable of liquid penetration to support the resin cement slurry components A and B, for example, a paper web or a fiberglass mat.

Alternatively, the substrate can be non-penetrable, such as a rigid mold. When the reactive substrate is impregnated with the second liquid component, the reaction begins and continues exothermically during set-up and curing driving away any water in the mixture without the need for any externally applied heat. The resin is completely cured without any externally applied heat within a period ranging from several hours to several days.

In accordance with one important embodiment of the present invention, the inorganic resin cement of the present invention is formed in situ within and on a liquid-penetrable substrate by the reaction upon contact of a liquid component A comprising an aqueous solution of an aluminum phosphate, a magnesium phosphate or a mixture thereof with a substrate-held component B comprising a non-reactive dispersing agent and a source of a phosphate-reactive magnesium oxide and/or reactive wollastonite constituent. The phosphate reactive constituent can be reactive wollastonite, any source of magnesium oxide, such as defined herein as wollastonite having an aspect ratio less than about 10:1; magnesium oxide having a relatively low surface area for example, dead-burned magnesium oxide or any other source of magnesium oxide having a surface area in the range of about 0.1 $m^2/gm$ to about 5 $m^2/gm$; or mixtures thereof. The inorganic resin formed by reaction between components A and B are characterized by good strength; nonflammability; resistance to heat, chemicals, including water, and ultra-violet radiation; and by its adaptability to being formed into structural configurations. The resin of the present invention may also include, in components A or B, fillers such as silica, milled fibers, preformed cellular materials, and the like as well as non-reactive wollastonite, defined as wollastonite having an aspect ratio of at least 15:1. These additives contribute to the various desired properties of the resin and of the articles of manufacture including the resin. Finally, the resins may be cellular in form, the preferred size of the cells ranging from ultrafine to medium.

In accordance with one important embodiment of the present invention, the inorganic resins are formed in situ within a liquid-penetrable substrate by providing two separate liquid components capable of extended shelf life when separated and immediate reaction when mixed to form the resin. The reaction is exothermic and no additional heat is required to accomplish resin set-up and final cure.

In accordance with one important feature of the present invention the reactive substrate, impregnated with liquid component B, is dried prior to contact with liquid component A to minimize the quantity of water that must be driven off by the exothermic reaction. For example, after thorough impregnation of a liquid-penetrable substrate with the component B slurry, the mat is passed through a pressure nip disposed between opposed pressure rollers to remove excess component B slurry. After the pressure nip, the wet mat is dried in an oven at a temperature of 120° F. to 300° F. until bone dry, or until the reactive mat is less than about 10% by weight moisture. The dried reactive mats remain flexible so that they can be rolled for convenient impregnation with the component A slurry when ready for reaction and use.

The quantity of water in the component A slurry should be maintained at a relatively low level e.g. less than 40% by total weight of the mixture, and preferably less than 25% of the total mixture weight to minimize the amount of water removed during curing. In accordance with another important feature of the present invention, the total water in the reactive substrate, after impregnation with the component A slurry, is less than 30% by total weight of the combination of components A and B in the component A-impregnated reactive substrate to increase resin stability and integrity while permitting set-up times ranging from as little as 30 seconds to several (e.g., 15) minutes and cure times of the order of a few hours to a few days. The resins may be formed in situ within the substrate with or without cells and include a unique combination of properties including high strength; good thermal, electrical and acoustical insulative properties; chemical and moisture resistance; nonflammability and nonsmoking. The structure of the cellular forms may be varied to provide materials of varying densities.

Liquid component A includes any aluminum phosphate, e.g. $Al_2(HPO_4)_3$ and/or $Al(H_2PO_4)_3$ and/or any magnesium phosphate, e.g. $Mg_2(HPO_4)_3$ and/or $Mg(H_2PO_4)_2$ or a mixture thereof in the form of an aqueous solution. Liquid component B comprises an essentially non-reactive dispersing agent and a source of a phosphate-reactive magnesium oxide and/or a phosphate-reactive wollastonite constituent.

The viscosities of these two liquid components can be any value so long as the liquids are capable of penetrating the liquid-penetrable substrates so that the liquids A and B, and the reactive components thereof, penetrate the substrate for in situ reaction and internal resin formation. The ensuing reaction, within and on the substrate, is exothermic and rapid. The liquid times, set-up times, and foaming times, as well as the physical properties and physical forms of the resin can be predetermined through the addition of various constituents to the two components. This will be made apparent from the following detailed description of the two liquid components and the examples.

To achieve the full advantage of the present invention the amount of water in each of components A and B should be minimized, provided the two components are pourable, and substrate-penetrable liquids. Excess water e.g. more than about 40% in the reactive substrate upon impregnation with a component, based on the total weight of components A and B, may result in shrinking and cracking, steam explosion, and/or bond rupturing in the resins during setting and curing as well as during any subsequent use of the articles of manufacture at elevated temperatures. The exothermic reaction of components A and B provides a controlled source of energy sufficient to remove any water from the resin bound articles while maintaining the structure of the resin. Resin configurations, e.g., sheets, bricks, panels, molded and extruded structures and the like, can be formed within minutes without any additional energy input. These configurations exhibit good dimensional stability, remaining essentially unchanged during their subsequent use.

In accordance with another new and unexpected embodiment of the present invention, reactive wollastonite and magnesium oxide are both included in component B so that reactive wollastonite, as well as MgO forms a part of the reactive substrate. It has been found in accordance with the present invention that wollastonite (reactive) reacts rapidly with mono magnesium phosphate and/or mono aluminum phosphate to form an inorganic resin cement while being relatively non-reactive with phosphoric acid or other acid phosphate salts. This unexpected reaction between wollastonite and an aluminum phosphate or a magnesium phosphate, such as mono aluminum phosphate or mono magnesium phosphate, permits the use of 0+ to 100-% reactive wollastonite as the phosphate reactive constituent in component B, the remainder of the phosphate reactive constituent being magnesium oxide.

Component A

The aluminum phosphate and/or magnesium phosphate of component A are preferably supplied in the form of clear syrupy aqueous solutions, the water in the solutions providing the liquid vehicle for component A to achieve a penetration of liquid penetrable substrates. A suitable viscosity for component A is 700 to 10,000 centipoises at 25° C.

Exemplary of a suitable aluminum phosphate solution is a mono aluminum phosphate solution analyzing 8% $Al_2O_3$ and 33.7% $P_2O_5$, (solids concentration of 50 weight %) and having a specific gravity of 1.47, a pH of 1.0 and a Baume value of 47.5°. Exemplary of a suitable magnesium phosphate solution is mono magnesium phosphate solution analyzing 5.3% MgO and 32.6% $P_2O_5$, (solids concentration of 44 weight %) and having a specific gravity of 1.38, a pH of 1.2 (1% solution) and a Baume value of 42.9°. The amount of aqueous aluminum phosphate and/or magnesium phosphate solution in component A should range between about 20% and about 70% by weight of the total weight of components A and B, when mixed. The amount of phosphate constituent (solids basis) should range between about 10% and 35% by total weight of components A and B.

Generally, the use of an aluminum phosphate is preferred over a magnesium phosphate for forming cellular resins when a chemical blowing agent is used since the resulting resins exhibit somewhat better high-temperature resistance. On the other hand, the magnesium phosphates generally form resins having greater strength. A mixture of the two phosphate constituents provides resins having a desired combination of strength and high-temperature resistance.

In accordance with another important feature of the present invention, one or more inert, low water-demand fillers may be added to component A to form inorganic resins having various physical characteristics. To achieve the full advantage of the present invention, the fillers should require no more than about 30 cc water to make a flowable paste of 100 gm of filler. Exemplary of suitable fillers are silica (minus 325-mesh), mineral or glass milled fibers, powdered glass, glass beads, flint, titania feldspar, kyanite, and mullite, some clays, barytes and the like, as well as mixtures of these. The filler may be present in an amount up to about 50% by weight of the total weight of components A and B, the amount being determined by such factors as water demand, component viscosity required, and physical characteristics desired of the final inorganic resins.

If it is desired to form a syntactic cellular structure, i.e., one incorporating preformed cellular fillers, then such fillers may be added to component A. A number of different types of such preformed cellular fillers are available, including glass; ceramic or synthetic organic resin bubbles; vermiculite; and the like. The cellular filler also should not require more than about 30 cc water to make a flowable paste of 100 gm of filler. The amount of cellular filler to be added will depend upon the cellular structure desired in the final resin bound article of manufacture or upon the final viscosity of component A needed to achieve substrate penetration of component A. The total amount of all types of fillers added may be up to about 50% by weight of the total weight of components A and B.

In accordance with another important embodiment of the present invention, in some resin formulations, particularly those having a cellular structure formed by a blowing or foaming agent, wollastonite in a form which is substantially unreactive is added to the aluminum phosphate and/or magnesium phosphate of component A. A typical less reactive form of wollastonite useful in accordance with this embodiment of the present invention is a finely divided acicular material having an aspect ratio of at least about 15 to 1 and a surface area of less than about 1.0 $m^2$/gm. It is a naturally occurring mineral which is essentially pure calcium metasilicate, $CaSiO_3$, having a molecular weight of 116. Surprisingly, the addition of the less reactive wollastonite to component A reduces cracks and shrinkage in the inorganic resinsubstrate articles formed. The less reactive wollastonite, when added to component A in accordance with this embodiment of the present invention, is added in an amount up to about 10% by total weight of components A and B. To achieve the full advantage of this embodiment of the present invention, the less reactive wollastonite is added to component A in an amount up to about 5% by total weight of components A and B to be held by the liquid-penetrable substrate. To achieve an exceptionally long storage life of component A, the less reactive wollastonite fibers of component A should be added shortly before the reactive subtrate is impregnated with component A, to prevent any premature reaction of the wollastonite fibers with the aluminum or magnesium phosphate of component A, since even the less reactive wollastonite, as defined herein, reacts with the phosphate.

The liquid component A should include a water-repellant surfactant in an amount of about 0.2% to about 5% by total weight of components A and B when a blowing agent is included to form the inorganic resins in cellular form. This surfactant stabilizes the foam during formation and set-up and controls the cell size and density of the final cellular resin. To achieve the full advantage of this embodiment of the present invention, the surfactant should be a non-carbonizing surfactant, such as hydrophobic fumed silica, silicone or a titanate to prevent formation of carbon within the resin during set-up and curing. If carbonization can be tolerated, surfactants such as calcium, zinc or aluminum stearate may be used. A small amount of such water-repellent surfactants may be added to component A or B or both in formulating non-cellular structures as well as cellular structures in accordance with the present invention.

It may be desirable to control and predetermine the profile of water release from the resin-forming reaction within the substrates during cure and subsequent heating of the resin-containing articles of the present invention for particular uses. Water release can be controlled, in accordance with another important feature of the present invention, by replacing all or part of the inert, low water-demand filler, such as silica, with a chemically hydrated, water-releasing material, such as finely divided hydrated alumina, i.e. $Al_2O_3 \cdot 3H_2O$. The use of such a water-releasing material is illustrated in example 13.

In formulating component A, the water solution of the mono aluminum phosphate, mono magnesium phosphate or mixtures thereof, is prepared by adding water to the phosphate(s) to provide the predetermined concentration of phosphate reactant in water. This liquid is preferably maintained at a temperature of about 15° C. (about 60° F.) to prevent overheating during component mixing.

The less reactive wollastonite, fillers and surfactants, if any, are added to the liquid and mixed to form a slurry ready for impregnation into a liquidpenetrable reactive substrate.

Component B

Component B provides a phosphate-reactive constituent which may be wollastonite, a source of magnesium oxide or a mixture thereof. The wollastonite of component B is distinguished from that added to component A in that it is of an acicular form having an aspect ratio of 10 or less. To achieve the full advantage of the present invention, the reactive wollastonite of component B should have an aspect ratio of less than 8 and, in particular, about 5 to 1. To achieve the full advantage of the present invention, the surface area of the reactive wollastonite should be at least 1.0 $m^2$/gm. and, in particular, at least 1.25 $m^2$/gm. A typical reactive wollastonite useful in accordance with the present invention has a surface area of about 1.55 $m^2$/gm. Like the wollastonite of component A it is essentially pure calcium metasilicate, but unlike the material with the much higher aspect ratio, it is highly reactive with the aluminum phosphate or magnesium phosphate constituent. In accordance with an important feature of the present invention, the use of at least some reactive wollastonite as the phosphate-reactive constituent minimizes cracks and shrinkage in the final articles of manufacture. The amount of the reactive wollastonite in component B may be up to about 40% by weight of the total weight of components A and B. Other phosphate reactive materials, such as nepheline syenite may replace the wollastonite and magnesium oxide source in an amount of about 75% by weight of reactive wollastone and reactive source of magnesium oxide.

The source of magnesium oxide used as the phosphate-reactive constituent can be considered to have a relatively low reactivity when compared with so-called reactive magnesium oxides having surface areas of at least 5 $m^2$/gm. In accordance with the present invention, the magnesium oxide should have a surface area of less than about 2.0 $m^2$/gm. To achieve the full advantage of the present invention, the magnesium oxide should have a surface area of 1.0 $m^2$/gm. or lower. A typical magnesium oxide useful in accordance with the present invention has a surface area of 0.75 $m^2$/gm. and is classified as high density, low reactivity magnesium oxide. The magnesium oxide should be finely ground and preferably is sized to pass a 325-mesh screen. The amount of this magnesium oxide in component B may be up to about 50% by weight of the total weight of components A and B. In general, the more magnesium oxide added the more reactive is the mixture and the shorter is the resin set time. In accordance with an important feature of the present invention, the addition of some magnesium oxide imparts added strength to the final resin.

When both wollastonite and a source of magnesium oxide are used as the phosphate-reactive constituent in component B, the relative amounts of these reactants may extend over the entire range of from 0+to 100-%. To achieve the full advantage of the present invention, the relative amounts of phosphate solution of component A to phosphate-reactive constituent of component B may range from about 90% MgO and/or reactive wollastonite to 10% aluminum phosphate and/or magnesium phosphate to 40% MgO and/or reactive wollastonite to 60% aluminum phosphate and/or magnesium phosphate (weight basis).

In accordance with another important feature of the present invention, the dispersing agent is an aqueous phosphate dispersant selected from the group consisting of sodium hexametaphosphate, sodium tripolyphosphate, sodium acid pyrophosphate, trisodium phosphate and tripotassium phosphate. The dispersing agent should be essentially unreactive with the other resin components in the slurry that the dispersing agent is mixed into under the conditions of formulation and mixing. To achieve the full advantage of the present invention, when a noncellular resin is formed with an aluminum phosphate in accordance with one embodiment of the present invention, the dispersing agent should be sodium tripolyphoshpate, sodium hexametaphosphate, sodium acid pyrophosphate or mixtures thereof. One or more of these dispersing agents when used with an aluminum phosphate to form a noncellular resin provides resins with unexpectedly better strength than other non-reactive dispersing agents. The concentration of the dispersing agent in aqueous solution and the amount of such solution are chosen to effect the required dispersing action and to supply the liquid vehicle of component B for substrate penetration. An optimum amount of this dispersing agent may be readily determined for any selected resin composition. As will be seen in example 11, when a chemical blowing agent such as calcium carbonate is used to form a cellular resin, then the dispersing agent should be chosen to maintain the pH of component B below about 10 to permit the release of carbon dioxide.

One or more inert, low water-demand fillers of the type added to component A, as described, also may be added to component B. If such an inert filler is incoporated in both components A and B, then the total quantity added may amount up to about 50% by total weight of components A and B.

In accordance with another important embodiment of the present invention, cellular structures can be formed by using a chemical blowing agent capable of producing a gas during the mixing of components A and B. The blowing agent is added to component B initially impregnated into the liquid-penetrable substrate in forming the reactive substrate. The blowing agent should be one capable of releasing a gas either by reaction, decomposition or vaporization upon reaction when the reactive substrate is contacted with component A. Although it is possible to use other inorganic carbonates, e.g., sodium carbonate and sodium bicarbonate, to achieve the full advantage of the present invention, the chemical blowing agent should be calcium carbonate sized to pass a 325-mesh screen. By adjusting the amount of calcium carbonate, it is possible to form cellular inorganic resins having densities ranging from about 10 to about 50 pounds/cubic foot. In accordance with another important feature of the present invention, the amount of blowing agent added to component B may range from about 0.2% to about 15% by total weight of components A and B, and to achieve the full advantage of the present invention when a blowing agent is used, the amount of blowing agent should be in the range of about 0.5% to about 6% by total weight.

In accordance with another important feature of the present invention, when a magnesium phosphate is used as the phosphate reactive constituent, dipotassium phosphate, tripotassium phosphate, potassium tripolyphosphate, tetrapotassium pyro phosphate or mixtures of said dispersing agents provide inorganic resin cement articles of manufacture with new and unexpected strengths which are at least double the strengths achieved with other dispersing agents tested. These particular dispersing agents react with mono aluminum phosphate and therefore are not suitable in the formula where mono aluminum phosphate is at least 10% of the total weight of the phosphate reactive constituent.

Cellular resins also can be manufactured in accordance with the principles of the present invention by using an inert compressed gas, such as carbon dioxide or air as a physical blowing agent. The physical blowing agent may be introduced through the substrate as component A is impregnated into the reactive substrate to bubble through the substrate during reaction.

The water-repellant surfactant added to component A may be added into component B either in addition to or in place of that added to component A. The total quantity added to components A or B or both should not be more than about 5% by total component weight.

In formulating component B, the water solution of the dispersing agent provides the liquid vehicle and to it are added, with stirring, the phosphate-reactive constituent (wollastonite, and/or a source of magnesium oxide) along with the blowing agent, if used, and any additional fillers and surfactants. Component B, like component A, is preferably cooled to about 15° C. prior to impregnation into the reactive substrate. In accordance with another important feature of the present invention extended shelf life for component B can be achieved by formulating component B in dry form, and adding water prior to impregnating component B into the liquid-penetrable substrate to form the reactive substrate.

By choice of reactants, the time over which the reactive substrate remains wet and flexible may be varied between some 30 seconds to as much as about 10 minutes. Likewise, in forming cellular resins, the "foam rise" time may be adjusted and varied between about one minute and 5 minutes and the "foam set" time between about 1.5 and 10 minutes. As noted previously, the water-repellent surfactant stabilizes the cellular resin during foaming and set-up, that is, it prevents cell collapse until the resin sets. Complete curing of the resin takes place at ambient temperature and requires a relative short time, e.g., from several hours to a few days.

The liquid components A and B are impregnated into a liquid-penetrable substrate by any suitable method and apparatus, as by spraying, coating onto the substrate surface, or any suitable technique. Because of its nonflammability it is particularly suited for wall panelings; because of its resistance to chemicals and moisture it may be used in making pipes, ducts, and the like; and because of its high dielectric properties it may be formed into insulators, and the like. It will be appreciated that these are but a few exemplary uses for the unique inorganic resins of this invention.

The compositions, products and process of this invention may be further described with reference to the following examples which are meant to be illustrative and not limiting.

In the following examples the amounts of the various constituents are given in parts by weight. The two components were formulated separately in high speed blenders and then mixed or blended in a mechanical mixer to illustrate the resins which will form in situ within a liquid-penetrable substrate. Components A and B were each at about 15.5° C. (60° F.) when mixing began. The aluminum phosphate is a water solution of mono aluminum phosphate analyzed to contain 8% Al$_2$O$_3$ and 33.7% P$_2$O$_5$, (solids concentration of 50 weight %) 47.5° Baume; and the magnesium phosphate is a water solution of mono magnesium phosphate analyzed to contain 5.3% MgO and 32.6% P$_2$O$_5$, (solids concentration of 44 weight %) 42.9° Baume. The silica filler was −325 mesh and the wollastonite of component A is an acicular material with an aspect ratio of about 20:1 and surface area of 0.88 m$^2$/gm. The reactive wollastonite of component B is an acicular material with an aspect ratio of about 5:1 and surface area of 1.55 m$^2$/gm; and the source of magnesium oxide is a high purity technical grade material processed from magnesium rich brine, −325-mesh and having a surface area of 0.75 m$^2$/gm.

EXAMPLE 1

| Component A | |
|---|---|
| Mono magnesium phosphate | 100 parts |
| Silica | 100 |
| Wollastonite | 15 |
| Component B | |
| Tripotassium phosphate - 50% solution | 25 |
| Magnesium oxide | 70 |
| Silicone (e.g. Dow Corning 772, Union Carbide 272) | 1 |

The resin has a modulus of rupture of 750 psi after two hours and 1470 psi after four days; a 12.6% weight loss and a specific gravity of 1.64 after four days.

EXAMPLE 2

| Component A | |
|---|---|
| Mono magnesium phosphate | 100 parts |
| Silica | 100 |
| Component B | |
| Tripotassium phosphate - 50% solution | 35 |
| Wollastonite | 49 |
| Magnesium oxide | 21 |
| Silicone | 1 |

This resin has a modulus of rupture of 700 psi after four days.

EXAMPLE 3

Example 2 was repeated using the same component A but changing the ratio of wollastonite to magnesium oxide in component B from 70/30 of Example 2 to 10/90. The effect of the magnesium oxide on resin strength was shown by the fact that the resin of this example has a modulus of rupture of 700 psi after two hours and 1470 psi after four days.

EXAMPLE 4

| Component A | |
|---|---|
| Mono aluminum phosphate | 100 parts |
| Silica | 100 |
| Component B | |
| Trisodium phosphate - 5% solution | 30 |
| Wollastonite | 35 |
| Magnesium oxide | 35 |
| Silicone | 1 |

The resin has a modulus of rupture of 120 psi after two hours and 300 psi after four days.

EXAMPLE 5

| Component A | |
|---|---|
| Mono aluminum phosphate | 150 parts |
| Silica | 150 |
| Wollastonite | 23 |
| Hydrophobic fumed silica - 10% methanol slurry | 2 |
| Component B | |
| Sodium tripolyphosphate - 10% solution | 47 |
| Wollastonite | 70 |
| Magnesium oxide | 20 |
| Calcium carbonate | 5 |

This formed a cellular resin having a very uniform, fine cell structure and a density of 22.0 pounds per cubic foot. The foam rise time was one minute and foam set time two and one-half minutes.

EXAMPLE 6

A cellular resin was made using the same component A as Example 5, but reducing the amount of dispersing agent to 36 parts and replacing the 90 parts of wollastonite/magnesium oxide with 105 parts of magnesium oxide. The resin had a very uniform fine cell structure, a density of 23.0 pounds per cubic foot, a foam rise time of one minute and a foam set time of one and one-half minutes.

EXAMPLE 7

The mono aluminum phosphate of example 5 was replaced by an equal weight of mono magnesium phosphate to form a cellular resin having a density of 23.0 pounds per cubic foot, a foam rise time of one minute and a foam set time of one and one-half minutes.

EXAMPLE 8

The mono aluminum phosphate of example 5 was replaced by an equal weight of mono magnesium phosphate to form a cellular resin having a density of 23 pounds per cubic foot, a foam rise time of one minute and a foam set time of one and one-half minutes.

EXAMPLE 9

Using the resin compositions of examples 5–8 and varying the amount of calcium carbonate blowing agent used from 0.5 to 6.0 parts produced cellular resins having densities ranging from 32 to 10 pounds per cubic foot, respectively.

EXAMPLE 10

| Component A | |
|---|---|
| Mono aluminum phosphate | 150 parts |
| Clay | 2 |

| | |
|---|---|
| Calcium stearate | 6 |
| Component B | |
| Sodium tripolyphosphate - 10% solution | 50 |
| Wollastonite | 75 |
| Magnesium | 20 |
| Calcium carbonate | 4 |
| Silicone | 1 |

The resulting cellular resin has uniform, medium sized cells and a density of 25.6 pounds per cubic foot. It has a foam rise time of two minutes and a foam set time of seven minutes. Exposure of the cellular resin to temperatures over 500° C. caused the calcium stearate to carbonize, smoke and leave a black deposit. Otherwise, the cellular resin retained its strength, nonflammability and other characteristics.

EXAMPLE 11

A series of resin compositions were made up to form cellular resins using the same components A and B of examples 5 and 7, except that the amount and type of dispersing agent added to component B were varied. The pH of each component B was measured and its effect on the density of the resulting cellular material noted. The results are tabulated below in Table 1.

TABLE 1

Effect of Component B pH on Cellular Resin Formation

| Dispersing Agent in Component B | pH of Component B | Cellular Density, lbs/ft$^3$ MAP* | MMP** |
|---|---|---|---|
| Sodium tripoly-phosphate (10%) | 9.8 | 22.0 | 23.0 |
| Sodium hexameta-phosphate (25%) | 6.9 | 22.0 | 23.0 |
| Sodium hexameta-phosphate (50%) | 6.9 | 22.0 | 23.0 |
| Sodium acid pyro-phosphate (10%) | 4.2 | 20.0 | 23.0 |
| Tripotassium phosphate (50%) | 11.5 | reacted with MAP* | no foam formed |

*Mono aluminum phosphate
**Mono magnesium phosphate

From these data it will be seen that the dispersing agent should be essentially nonreactive and that it should not be used to the extent that it raises the pH of component B above that which prevents the release of carbon dioxide from the calcium carbonate blowing agent.

EXAMPLE 12

A series of resin compositions were made up to form cellular resins using the same components A and B of example 5, except that the amount and type of water-repellant surfactant added to component A were varied. The effect of these variations on cell structure of the resulting resins is noted in the following Table 2.

TABLE 2

Effect of Surfactant on Cell Structure

| Surfactant | Wt. % Surfactant | Cell Struc./Sz. (inch) |
|---|---|---|
| Hydrophobic fumed silica (10%) | 0.43 | Medium to fine/0.020 |
| Hydrophobic fumed silica (10%) | 1.0 | Ultrafine/0.010 |
| Titanate* | 0.43 | Large/0.060 |
| Titanate* | 1.0 | Medium to Lge./0.040 |
| Silicone | 1.0 | Medium/0.030 |

TABLE 2-continued

Effect of Surfactant on Cell Structure

| Surfactant | Wt. % Surfactant | Cell Struc./Sz. (inch) |
|---|---|---|
| Aluminum Stearate | 1.0 | Medium/0.030 |
| Calcium Stearate | 1.0 | Medium/0.030 |
| Calcium Stearate | 1.5 | Medium/0.030 |
| Zinc Stearate | 1.0 | Medium/0.030 |

It will be seen from these data that it is possible to predetermine and control cell size by the selection of the type of surfactant and the amount used.

EXAMPLE 13

This example illustrates the effect which the addition of a water-control agent has upon the strength and upon the moisture content of the resin formed. A first resin was made up in the manner described above using the following:

| | |
|---|---|
| Component A | |
| Mono magnesium phosphate | 100 parts |
| Silica | 100 |
| Wollastonite | 10 |
| Component B | |
| Sodium hexametaphosphate (50%) | 40 |
| Magnesium oxide | 50 |
| Silicone | 1 |

A second resin was made up in the manner described above using the following:

| | |
|---|---|
| Component A | |
| Mono aluminum phosphate | 100 parts |
| Alumina trihydrate | 100 |
| Wollastonite | 10 |
| Component B | |
| Trisodium phosphate (5%) | 24 |
| Magnesium oxide | 70 |
| Silicone | 1 |

The strengths of the resulting resins were measured and weight losses measured when they were heated to 200° C. Finally, they were heated until maximum weight loss was experienced. These data are tabulated in Table 3.

TABLE 3

Strength and Weight Losses of Resins

| Item | Resin First | Second |
|---|---|---|
| Strength-modulus of rupture, psi | 1420 | 675 |
| Weight loss, % total weight | | |
| at 200° C. | 10 | 12 |
| maximum | 12 | 27 |
| Temperature of maximum loss, °C. | 350 | 700 |

It will be seen from these data that the alumina trihydrate present in the second formulation altered the amount of water retained in the cured resin and the temperature profile for the water removal from the resin.

EXAMPLE 14

| Component A | |
|---|---|
| Mono aluminum phosphate | 100 parts |
| Silica | 100 |
| Component B | |
| 5% Trisodium phosphate solution | 35 |
| Wollastonite (5:1 aspect ratio) | 70 |

The resin has a modulus of rupture of 225 psi after four days and a specific gravity of 1.10.

The inorganic resins formed in accordance with this invention have many uses in their noncellular and cellular forms. Because of their nonflammability and nonsmoking they may be formed into such structural configurations as panels, walls, doors, piping, duct-work and the like and used in applications where the burning of such structures is not desirable or can not be tolerated. These resins may be used as acoustical, electrical or thermal insulation. They may be used to form a poured-in-place foam, to repair cracks, to coat surfaces, and to serve as an adhesive. Unlike many organic resins, the inorganic resins of this invention are resistant to chemicals, organic and inorganic, and they are unaffected by ultraviolet radiation making them particularly suitable for outdoor use in a variety of climates. Finally, the resins of this invention are inexpensive relative to those formed of organic constituents.

The liquid-penetrable substrates include any substrate capable of impregnation with the inorganic resin components A and B described herein. Suitable liquid-penetrable substrates include cellulose papers; papers made from combinations of cellulose with glass and/or synthetic fibers, e.g. ⅓ cellulose, ⅓ glass and ⅓ polyester fibers; glass fiber mats and chopped strand glass mats bonded with any suitable binder, e.g. polyester resin; and man-made boards including acoustical boards, insulation boards, fiberboards including hardboards, oriented strand boards, wafer boards, chip boards, particle boards and the like. The most useful substrates are flexible so that they can be rolled both before and after impregnation with component B and thereafter cut to size before or after impregnation with component A and drying, and have an openness value of 50 to 400 cfm, as measured by the Frazier permeability test.

In accordance with an important feature of the present invention, the reactive substrates impregnated with component B and A are stacked one upon another to any desired thickness and then pressed to form laminates and cured. The thickness of the laminated products is predetermined by the thickness of the individual impregnated plies, the number of plies stacked, and the pressure applied with a smooth or embossed plate of a suitable platen press. Normally, the stack of plies should be pressed at a pressure of 1,000 to 5,000 psig, however the pressure can be varied depending upon the number of plies and the uniformity or non-uniformity of density desired in the final product. Accordingly, any pressure above atmospheric will be workable to provide a laminate of reduced thickness and increased density.

The porosity of the liquid-penetrable substrates may affect the amount of components A and B penetrating the substrate since low porosity substrates will accept less of the components. Accordingly, a suitable vacuum chamber or pressure chamber can be used to achieve greater penetration and holding of components A and B in lower porosity substrates. Further, the formulation of component B can be modified for suitable penetration of substrates having different porosities. For example, a suitable component B formulation for a substrate having a relatively low porosity is, in parts by weight:

300 parts of a 10% solution of sodium tripoly phosphate or sodium hexametaphosphate 200 parts of number 10 magnesium oxide (a desired portion of the MgO can be substituted with 325 wollastonite)

4 parts clay (e.g. attapulgite)

A suitable component B formulation for a substrate having a relatively high porosity is, in parts by weight:

300 parts of a 10% solution of sodium tripoly phosphate or sodium hexametaphosphate 400 parts of number 10 magnesium oxide (a desired portion of the MgO can be substituted with 325 wollastonite)

4 parts clay (e.g. attapulgite)

The magnesium oxide solids pick-up of the liquid-penetrable substrate will vary between 10 to 30% by weight based on the dry weight of the solids in the substrate. After impregnation with component B and removal of excess liquid, such as by squeezing the reactive substrate between pressure rollers, the reactive substrate is dried at 20° F. to 300° F. to remove excess water. The reactive substrate then is impregnated or saturated with component A containing an aluminum phosphate or a magnesium phosphate. The substrate containing both components then is treated to remove the excess component A liquid, such as by again squeezing the substrate between pressure rollers. The reacting substrate then can be placed under pressure (static or squeeze rolls) to continue the magnesium oxide-phosphate binder reaction under pressure, or the reaction can continue under ambient conditions. The binder MgO to phosphate ratio can vary between 90% by weight MgO to 10% by weight phosphate to 40% by weight MgO to 60% by weight phosphate on a solids basis.

The following table I illustrates various fibrous substrates impregnated with components A and B at different ratios and then molded for 5 to 10 minutes:

TABLE I

| Substrate | Range (% by weight) MgO/MAP Solids Ratio | Av Mod. of Rupture (PSI)* | Range Mod. of Rupture (PSI)* |
|---|---|---|---|
| Cellulose paper Hollingsworth-Vose 2150 | 39/61–40/60 | 1988 | 1250–2343 |
| Cellulose paper Hollingsworth-Vose 2150 | 50/50–60/40 | 1803 | 1530–2083 |
| Glass mat Johns Manville 7015 | 34/66–30/70 | 4312 | 3000–5625 |
| Glass mat Johns Manville 7013 | 91/9–86/14 | 3524 | 1302–5751 |
| Chopped strand glass mat | — | 7812 | — |

*after 7 day cure

| % (by weight) Substrate Fibers | % (by weight) MgO-MAP Binder |
|---|---|
| 14.2 | 85.8 |
| 17.6 | 82.4 |
| 6.6 | 93.3 |
| 8.5 | 91.5 |

TABLE I-continued

| Substrate | Range (% by weight) MgO/MAP Solids Ratio | Av Mod. of Rupture (PSI)* | Range Mod. of Rupture (PSI)* |
|---|---|---|---|
| | 30.0 | 70.0 | |

Additional fibrous webs of cellulose fibers, fiberglass or combinations of fiberglass, polyester fibers and cellulose fibers were saturated with component B consisting of 1200 parts by weight magnesium oxide, 820 parts by weight 10% sodium tripolyphosphate solution, and 12 parts by weight attapulgite clay. After the webs were squeezed to remove excess component B and dried, they were then saturated with a monoammonium phosphate (MAP) component B to provide a ratio of MgO/MAP set forth in Table II. The webs then were squeezed to remove excess MAP solution, dried and pressed together into 4 plies unless indicated otherwise. The strengths of the resulting laminates and percentages of substrate solids and inorganic binder are set forth in table II, below

TABLE II

| Substrate | % MgO/MAP | Av. Mod. of Rupture (PSI) | % Substrate Solids | % Inorganic Binder |
|---|---|---|---|---|
| Fiberglass/Kevlar | 30/70 | 3000 | 5.4 | 94.6 |
| Polyester | 70/30 | 1171 | 14.3 | 85.7 |
| 50% fiberglass 40% polyester 10% cellulose | 56/44 | 6250 | 10.8 | 89.2 |
| cellulose | 48.5/51.5 | 4250 | 19.8 | 80.2 |
| fiberglass mat | — | — | MgO filled pores | |
| Glass veil | — | — | MgO filled pores | |
| Glass veil 8 plies | 74.5/25.5 | 4097 | 14.2 | 85.8 |
| 4 plies chopped strand glass mat 8 plies glass veil | 52/48 | 5729 | 25.6 | 74.4 |

Glass veils were saturated with a component B consisting of 400 parts by weight MgO, 300 parts by weight 60% solution of tetra potassium pyrophosphate (TKPP) and 4 parts by weight attapulgite clay and a component A solution of monomagnesium phosphate. The veils were squeezed and dried after each impregnation and stacked in 4 plies and pressed at 10 psig and the data of Table III were collected.

TABLE III

| Substrate | % MgO/MAP | Av. Mod. of Rupture (PSI) | % Substrate Solids | % Inorganic Binder |
|---|---|---|---|---|
| Glass veil | 12.3 | 4166 | 8.2 | 91.8 |

It will thus be seen that the objects set forth above, among those made apparent from the preceding description, are efficiently attained, and, since certain changes may be made in carrying out the above process, in the composition set forth and in the described article without departing from the scope of the invention, it is intended that all matter contained in the above description shall be interpreted as illustrative and not in a limiting sense.

We claim:

1. A method of strengthening a liquid-penetrable, solid substrate with an inorganic binder comprising contacting a liquid penetrable solid article with a first composition including a phosphate-reactive material selected from the group consisting of a source of magnesium oxide, wollastonite, and mixtures thereof; and an essentially nonreactive phosphate dispersing agent to form a reactive substrate, and contacting the reactive substrate with a second composition comprising water; and an aluminum phosphate, a magnesium phosphate or mixtures thereof to form an inorganic binder in situ within the substrate.

2. The method of claim 1 wherein the first composition and/or the second composition includes an inert, low water-demand filler in an amount up to about 50% by weight of the total weight of said first and second compositions.

3. The method of claim 2 wherein said inert filler is silica.

4. The method of claim 2 wherein at least a portion of said filler comprises a preformed cellular material.

5. The method of claim 2 wherein at least a portion of said filler comprises a finely divided, chemically hydrated water releasing agent.

6. The method of claim 1 wherein said second composition includes wollastonite, substantially unreactive with said aluminum phosphate or said magnesium phosphate of the first composition, in an amount up to about 10% by weight of the total weight of said first and second compositions.

7. The method of claim 6 wherein said substantially unreactive wollastonite is a finely divided acicular material having an aspect ratio of at least about 15:1 and a surface area of less than about 1.0 $m^2/gm$.

8. The method of claim 1 wherein said first composition and/or said second composition includes a water-repellent surfactant in a total amount between about 0.2% and about 5% by weight of the total weight of said first and second compositions.

9. The method of claim 8 wherein said water-repellant surfactant is a hydrophobic fumed silica, a titanate, a silicone, a wax, or a stearate.

10. The method of claim 9 wherein said water-repellant surfactant is a hydrophobic fumed silica.

11. The method of claim 1 wherein said phosphate is mono aluminum phosphate.

12. The method of claim 1 wherein said second composition includes mono aluminum phosphate and/or mono magnesium phosphate, and has a solids content of 20-70 weight percent.

13. The method of claim 1 wherein the amount of said second composition is 20% to 70% by weight of the total weight of the first and second compositions.

14. The method of claim 1 wherein said source of phosphate reactive material is finely divided acicular wollastonite having as aspect ratio of less than about 10:1 and a surface area of at least about 1.0 $m^2/gm$ and is present in said first composition in an amount of up to about 40% by weight of the total weight of said first and second compositions.

15. The method of claim 1 wherein said non-reactive dispersing agent is a polyphosphate.

16. The method of claim 1 including adding a water-repellant surfactant and a blowing agent to the first or second composition capable of releasing a gas by reaction, decomposition or vaporization in said composition; and wherein said dispersing agent is one which does not raise the pH of said composition above about 10.

17. The method of claim 16 wherein said blowing agent is calcium carbonate in an amount ranging between about 0.2% and about 15% by weight of the total weight of said first and second compositions.

18. The method of claim 1 wherein the weight ratio of magnesium oxide plus reactive wollastonite of the first composition to aluminum phosphate and/or magnesium phosphate material of the second composition is 90/10 to 40/60.

19. The method of claim 1 wherein the first and second compositions, total, include up to about 50% by total weight of an inert, low-water demand filler, up to about 10% by weight of wollastonite substantially unreactive with said aluminum phosphate or said magnesium phosphate, and up to about 5% by weight of a water-repellent surfactant.

20. A process for strengthening a solid, liquid-penetrable substrate comprising:
(a) forming a liquid component A comprising water; and an aqueous solution of an aluminum phosphate, a magnesium phosphate or a mixture thereof;
(b) forming a separate liquid component B comprising an aqueous vehicle; a phosphate-reactive material selected from the group consisting of wollastonite, a source of magnesium oxide or mixtures thereof, and an essentially nonreactive phosphate dispersing agent;
(c) contacting said substrate with component B to absorb component B into said substrate and form a reactive substrate; and
(d) contacting said reactive substrate with component A to absorb component A into said reactive substrate and to begin reaction of said phosphate-reactive material with said aluminum phosphate and/or said magnesium phosphate.

21. The process of claim 20 including stacking a plurality of substrates impregnated with components A and B, prior to curing, and pressing said plurality of substrates together to form a laminate.

22. The process of claim 20 wherein said component A includes an inert, low water-demand filler in an amount up to about 50% by weight of the total weight of said components A and B.

23. The process of claim 20 wherein said component A includes finely divided acicular wollastonite having an aspect ratio of at least 15:1 in an amount up to about 10% by weight of the total weight of said components A and B.

24. The process of claim 20 wherein said component A, component B or both includes a water-repellant surfactant in a total amount between about 0.2% and 5% by weight of the total weight of said components A and B.

25. The process of claim 20 wherein the amount of said aqueous solution of component A ranges between about 20% and about 70% by weight of the total weight of components A and B.

26. The process of claim 20 wherein said component A has a solids content ranging between about 20 and about 70 weight percent.

27. The process of claim 20 wherein said reactive wollastonite is a finely divided acicular wollastonite material having an aspect ratio of less than about 10:1 and a surface area of at least about 1.0 m$^2$/gm and is present in both said components A and B.

28. The process of claim 20 wherein said non-reacting dispersing agent of said component B is a polyphosphate in an aqueous solution.

29. The process of claim 20 wherein at least one of said components A or B includes a water-repellant surfactant; wherein said component B includes a blowing agent capable of releasing a gas by reaction, decomposition or vaporization in said slurry; and wherein said dispersing agent is one which does not raise the pH of said slurry above 10, whereby, when said components A and B are mixed, said blowing agent releases said gas to cause said slurry to set up into a cellular inorganic resin.

30. The process of claim 29 wherein said blowing agent is calcium carbonate in an amount ranging between about 0.2% and about 15% by weight of the total weight of components A and B.

31. The process of claim 20 wherein at least one of said components A or B includes a water-repellant surfactant and said process includes the step of introducing an inert gas under pressure into said substrate to form a celluar inorganic resin in said substrate.

32. The process of claim 20 wherein the weight ratio of said mono aluminum phosphate, mono magnesium phosphate or mixture thereof of component A to said phosphate-reactive constituent of component B ranges between about 90/10 and about 40/60.

33. An article of manufacture formed by impregnating a liquid-penetrable substrate with a component B to absorb component B into said substrate to form a reactive substrate, and then contacting said reactive substrate with a component A to cause a reaction within the substrate wherein component A includes water; an aluminum phosphate, or a magnesium phosphate or a mixture thereof; and wherein component B includes a phosphate-reactive material selected from the group consisting of a source of magnesium oxide, wollastonite and mixtures thereof; and an essentially nonreactive phosphate dispersing agent.

34. The article of manufacture of claim 33 wherein component A or component B includes a low water-demand filler.

35. The article of manufacture of claim 34 wherein said filler is silica added in component A.

36. The article of manufacture of claim 33 wherein said phosphate-reactive material of component B comprises finely divided acicular wollastonite having an aspect ratio of about 5:1.

37. The article of manufacture of claim 33 wherein component A and/or component B includes wollastonite having an aspect ratio of at least 15:1 and wollastonite having an aspect ratio of less than 10:1.

38. The article of manufacture of claim 33 in cellular form.

39. The article of manufacture of claim 38 wherein the cells of said resin are formed by adding a surfactant and a blowing agent to component A or component B.

40. The article of manufacture of claim 39 wherein said surfactant is fumed hydrophobic silica and said blowing agent is calcium carbonate.

41. The article of manufacture of claim 33 wherein the dispersing agent is selected from the group consisting of sodium tripolyphosphate, sodium hexa-metaphosphate, sodium acid pyrophosphate, and mixtures thereof.

42. The article of manufacture of claim 33 wherein said phosphate is mono magnesium phosphate and the dispersing agent is selected from the group consisting of dipotassium phosphate, tripotassium phosphate, tripolyphosphate, tetrapotassium phosphate, and mixtures thereof.

43. A method of manufacturing a fiber-reinforced inorganic resin article comprising:
  impregnating a fibrous substrate with a first composition comprising a phosphate-reactive material selected from the group consisting of a source of magnesium oxide, wollastonite, and mixtures thereof; and an essentially nonreactive phosphate dispersing agent to form a reactive substrate;
  drying the reactive substrate;
  impregnating the dried reactive substrate with a second composition comprising water; and an aluminum phosphate, a magnesium phosphate or mixtures thereof to cause the aluminum phosphate and/or magnesium phosphate to react with the phosphate-reactive material impregnated into the reactive substrate.

44. The method of claim 43 including the step of drying the substrate after impregnation with the second composition.

45. The method of claim 43 including the step of removing excess, non-absorbed and adsorbed, impregnating solution from the substrate after both impregnating steps.

46. The method of claim 43 wherein the substrate is flexible, and including the step of winding the dried reactive substrate into a roll and storing or shipping said rolled reactive substrate prior to impregnation with the second composition.

47. The method of claim 43 including the step of curing the article after impregnation with said first and second compositions to form a strong, inorganic resin-bonded, fiber-reinforced article having 2 to 30% by weight reinforcing fiber and 70–98% by weight inorganic resin.

48. The method of claim 43 wherein fiber is included in the article in an amount of 5 to 20% by weight and the inorganic resin in an amount of 80–95% by weight.

* * * * *